United States Patent
Guinart et al.

(10) Patent No.: US 10,226,973 B2
(45) Date of Patent: Mar. 12, 2019

(54) COMMUNICATION METHOD BETWEEN A PLURALITY OF ELECTRONIC MEASUREMENT MODULES OF A MOTOR VEHICLE

(71) Applicants: CONTINENTAL AUTOMOTIVE FRANCE, Toulouse (FR);
CONTINENTAL AUTOMOTIVE GmbH, Hannover (DE)

(72) Inventors: Nicolas Guinart, Toulouse (FR);
Jean-Philippe Boisset, Montauban (FR); Olivier Fudulea, Toulouse (FR);
Jean-Charles Huard, Toulouse (FR)

(73) Assignees: CONTINENTAL AUTOMOTIVE FRANCE, Toulouse (FR);
CONTINENTAL AUTOMOTIVE GMBH, Hannover (DE)

(*) Notice: Subject to any disclaimer, the term of this patent is extended or adjusted under 35 U.S.C. 154(b) by 0 days.

(21) Appl. No.: 15/465,835

(22) Filed: Mar. 22, 2017

(65) Prior Publication Data
US 2017/0282654 A1    Oct. 5, 2017

(30) Foreign Application Priority Data
Mar. 31, 2016  (FR) ..................... 16 52805

(51) Int. Cl.
*B60C 23/04*    (2006.01)
*H04W 52/46*   (2009.01)
(Continued)

(52) U.S. Cl.
CPC ........ *B60C 23/0455* (2013.01); *B60C 23/007* (2013.01); *B60C 23/008* (2013.01);
(Continued)

(58) Field of Classification Search
CPC ............ B60C 23/0455; B60C 23/0483; B60C 23/0454; B60C 23/009; B60C 23/008;
(Continued)

(56) References Cited

U.S. PATENT DOCUMENTS

2006/0220813 A1* 10/2006 Utter ................... B60C 23/0406
                                                                340/442
2008/0094197 A1   4/2008 Huang
2009/0160629 A1*  6/2009 Shimura ............... B60C 23/007
                                                                340/431

FOREIGN PATENT DOCUMENTS

CN      1833893 A      9/2006
CN    101300144 A     11/2008
(Continued)

OTHER PUBLICATIONS

FR Search Report, dated Nov. 17, 2016, from corresponding FR application.

*Primary Examiner* — Erin F Heard
(74) *Attorney, Agent, or Firm* — Young & Thompson

(57) ABSTRACT

Disclosed is a method for communicating measurement messages between a plurality of electronic measurement modules and an electronic control unit of a motor vehicle. The method includes the steps of measurement (E1), by a primary emitter module, of parameter values associated with the wheel in which the module is mounted, of sending (E2), by the primary emitter module, of measurement messages to a relay module, of reception (E3) by the relay module, of the measurement messages sent, of measurement (E5), by the relay module, of parameter values associated with the wheel in which the relay module is mounted and of sending (E6), by the relay module, of the measurement messages received and of its own measurements to the electronic control unit.

20 Claims, 5 Drawing Sheets

(51) Int. Cl.
  *H04L 29/08* (2006.01)
  *B60C 23/00* (2006.01)
  *H04W 84/18* (2009.01)

(52) U.S. Cl.
  CPC ........ *B60C 23/009* (2013.01); *B60C 23/0454* (2013.01); *B60C 23/0483* (2013.01); *H04L 67/12* (2013.01); *H04W 52/46* (2013.01); *H04W 84/18* (2013.01)

(58) Field of Classification Search
  CPC ...... B60C 23/007; H04L 67/12; H04W 52/46; H04W 84/18
  See application file for complete search history.

(56) References Cited

FOREIGN PATENT DOCUMENTS

| | | |
|---|---|---|
| CN | 203157618 U | 8/2013 |
| CN | 204037246 U | 12/2014 |
| EP | 1 445 125 A2 | 8/2004 |
| EP | 1 669 220 A1 | 6/2006 |
| EP | 1 946 945 A1 | 7/2008 |
| JP | 2003/291615 A | 10/2003 |

\* cited by examiner

| 10B → ↓s | A | B | C | D | E | F |
|---|---|---|---|---|---|---|
| 6 | - | - | D | C | F | E |
| 5 | - | - | - | - | - | - |
| 4 | B | A | - | E | D | - |
| 3 | - | - | E | F | C | D |
| 2 | - | - | F | - | - | C |
| 1 | E,F | C,D | - | B | A | A |

COMMUNICATION METHOD BETWEEN A PLURALITY OF ELECTRONIC MEASUREMENT MODULES OF A MOTOR VEHICLE

FIELD OF THE INVENTION

The invention relates to the field of the communicating sensors mounted in the wheels of a motor vehicle and relates more particularly to a method for communicating information between a plurality of electronic measurement modules, each mounted in a wheel of a motor vehicle and an electronic control unit of said vehicle. The invention relates also to a system of electronic measurement modules for motor vehicles and a motor vehicle comprising such a system.

BACKGROUND OF THE INVENTION

These days, in a motor vehicle, it is known practice to mount, in each wheel, an electronic measurement module comprising one or more sensors in order to detect a wheel anomaly. These sensors can for example be a sensor of the inflation pressure of the tire and/or a wheel acceleration sensor.

FIG. 1 schematically shows a motor vehicle 1A comprising an electronic control unit 5A and ten wheels 10A (numbered from 10A-1 to 10A-10) each comprising an electronic measurement module 100A (numbered from 100A-1 to 100A-10).

Each module 100A sends its measurements to the electronic control unit 5A which uses them to detect an anomaly and inform the driver thereof. To this end, each electronic measurement module 100A emits, to the electronic control unit 5A, over a radio communication link L0, signals in which messages comprising the measurements are coded.

In the existing solutions, each module 100A emits the signals over a same type of radio communication link L0 independently of the other modules 100A.

Such operation requires each module 100A to emit the same message several times with a high power to ensure that the electronic control unit 5A receives a given message at least once, and all the more so since the module 100A is mounted in a wheel 10A that is far away, in terms of power, from the electronic control unit 5A, which is energy-intensive (that is to say degrades the energy budget) for each module 100A.

Such a method for uploading measurements from the modules 100A to the electronic control unit 5A is not efficient and significantly reduces the battery life of the modules 100A, which necessitates excessively frequent maintenance and therefore presents a major drawback.

One obvious solution would consist in using a plurality of electronic control units 5A distributed in the vehicle 1A, but that would significantly increase the cost and the complexity of the vehicle and would therefore present a significant drawback.

The aim of the invention is to at least partly remedy these drawbacks by proposing a simple, reliable and efficient solution, for communicating measurements and information between the modules and the electronic control unit which is energy-efficient and inexpensive.

To this end, the first subject of the invention is a method for communicating measurement messages between a plurality of electronic measurement modules and an electronic control unit of a motor vehicle, each of the electronic measurement modules being mounted in a wheel of said vehicle, said method comprising the steps of:

measurement, by at least one first electronic measurement module called primary emitter module, of parameter values associated with the wheel in which said primary emitter module is mounted, sending, by said primary emitter module, over a first radio communication link at a power below a first threshold, of measurement messages to at least one second electronic measurement module called relay module, reception, by said relay module, of the measurement messages sent over the first radio communication link, measurement, by the relay module, of parameter values associated with the wheel in which said relay module is mounted, sending, by the relay module, of the measurement messages received and of its own measurements to the electronic control unit over a second radio communication link at a power above a second threshold, higher than or equal to the first threshold.

The expression "sending messages" should be understood to mean the emission of radio signals in which are coded messages comprising measurements performed by an electronic measurement module or any other information, such as the identifier of the electronic measurement module for example.

The method according to the invention allows the electronic measurement modules furthest away from the electronic control unit in terms of radio power (that is to say the primary emitter modules) to emit measurement messages at low power to an electronic measurement module closer to the electronic control unit in terms of radio power (relay module) which then acts as a relay to transmit the measurements to the electronic control unit. Thus, with the method according to the invention, it is no longer necessary for the electronic measurement modules furthest away in terms of radio power to emit one and the same measurement message several times in succession, or to transmit at a high power since the message will be relayed by a relay module, closer to the electronic control unit, which makes it possible to save the energy of the primary emitter modules. The method according to the invention thus makes it possible to optimize the management of the electrical energy power supply batteries of at least some of the electronic measurement modules of the vehicle. The relay module is an electronic measurement module which sends its own measurements to the electronic control unit with the measurement messages received from the primary emitter module or modules.

Preferably, the method comprises a preliminary initialization step in order to define the role of each electronic measurement module of the vehicle, that is to say assign each module the function of primary emitter module, of secondary emitter module or of relay module.

According to one aspect of the invention, in this initialization step, each electronic measurement module emits, at different powers, an initialization message to the other electronic measurement modules and the electronic control unit in order to determine the distance, in terms of power, separating said module from the other modules and from the electronic control unit.

Each module which receives the initialization message emitted at a given power level then sends a response message comprising its identifier to the emitter module such that the emitter module then knows the power level at which it must emit to this module if this module has to receive measurement messages from it.

Advantageously, the electronic control unit receives, from each electronic measurement module, a list of the distances (in terms of power and not of physical distance) separating said module from the other modules and then compiles a message routing table.

More specifically, the electronic control unit classifies all the electronic measurement modules as a function of the determined distances (in terms of power) between the modules then determines the role of each module, that is to say whether each module is a primary emitter module (which must send its messages to at least one identified relay module), a relay module (which must receive measurement messages from one or more primary emitter modules and transfer them with its measurements to the electronic control unit) or a secondary emitter module (which must send its measurement messages directly to the electronic control unit).

The electronic control unit then informs each module of its role and in particular informs the primary emitter modules that they must emit at a power below the first threshold, the relay modules of the list of the identified primary emitter modules for which they must transfer the messages received to the electronic control unit in signals emitted at a power above the second threshold and, if necessary, the secondary emitter modules that they must emit signals comprising their measurement messages at a power above a third threshold.

Advantageously, the relay module concentrates the measurement messages received from a plurality of identified primary emitter modules from which it must receive messages before sending them grouped together to the electronic control unit with its own measurements.

The relay module can thus emit, at one and the same time, for example at high power, a set comprising the measurement messages received from the primary emitter modules and its own measurements, which makes it possible to ensure that all the messages sent by primary emitter modules and that the measurements performed by the relay module are received at one and the same time by the electronic control unit, thus avoiding the loss of any one of the messages. This also makes it possible to avoid a plurality of signal emissions at different instants, which strains the relay module and can therefore reduce the energy level stored in its battery.

Advantageously, the method comprises a step of sending of a switchover request to the electronic control unit following a switchover event to indicate to it that it is necessary to redefine all or some of the roles of the electronic measurement modules.

Such an event can be an energy level below a predetermined energy threshold. As a variant or in addition, the information on the battery level can be transmitted periodically to the electronic control unit such that the electronic control unit itself directly decides on the switchover.

The sending of a switchover request can be performed by any electronic measurement module whether it is a relay or emitter. The sending of a switchover request can also relate to any relevant specific type of event such as, for example, the detection of one or more new electronic measurement modules on the vehicle (for example replacing previous ones), the detection of one or more changes of positions or of location of the electronic measurement modules of the vehicle, the detection of a change of a measurement datum (for example the temperature in the tire or the load applied to the wheel). The sending of a switchover request can even be performed periodically (for example at the start of each running cycle, or every 24 hours, etc.).

SUMMARY OF THE INVENTION

The invention relates also to a communication system for a motor vehicle comprising an electronic control unit and a plurality of electronic measurement modules each mounted in a wheel of said vehicle, said plurality of electronic measurement modules comprising at least one first electronic measurement module called primary emitter module and at least one second electronic measurement module called relay module, said primary emitter module being configured to measure parameter values associated with the wheel in which said primary emitter module is mounted and to emit, to said relay module, over a first radio communication link at a power below a first threshold, signals comprising measurement messages, the relay module being configured to receive signals emitted by the primary emitter module, to measure parameter values associated with the wheel in which said relay module is mounted and to emit signals comprising the measurement messages received from the primary emitter modules, and its own measurements, to the electronic control unit over a second radio communication link at a power above a second threshold, higher than or equal to the first threshold.

Advantageously, the electronic control unit is configured to initialize the system by defining the role of each electronic measurement module of the vehicle.

To this end, each electronic measurement module is configured to emit, at different powers, an initialization message to the other electronic measurement modules and the electronic control unit.

Each of the other electronic measurement modules and the electronic control unit are then configured to evaluate the distance, in terms of power, separating it from the electronic measurement module emitting the initialization message when it receives this initialization message such that said module can create a list of the distances separating it from the other modules and from the electronic control unit and send said list to the electronic control unit.

The electronic control unit is then configured to
determine the role of each electronic measurement module from all the lists received from the electronic measurement modules,
inform the duly determined primary emitter modules of the relay modules to which they must emit signals comprising their measurement messages,
inform, if necessary, the duly determined secondary emitter modules that they must emit signals comprising their measurement messages to the electronic control unit, and
inform the relay modules of the list of the identified primary emitter modules for which they must transfer the received messages to the electronic control unit.

It goes without saying that the system can comprise only primary emitter modules and relay modules, without any secondary emitter modules.

Preferably, each electronic measurement module is configured to send a switchover request to the electronic control unit following a switchover event to indicate to it that it is necessary to redefine all or some of the roles of the electronic measurement modules.

The invention relates also to a motor vehicle comprising a system as presented previously.

BRIEF DESCRIPTION OF THE DRAWINGS

Other features and advantages of the invention will become apparent from the following description given in light of the attached figures which are given as nonlimiting examples and in which identical references are given to similar objects.

DETAILED DESCRIPTION OF INVENTION

In the present description, the term "distance" does not denote a physical distance (measurable in meters) but a distance in terms of power.

Figure 1:
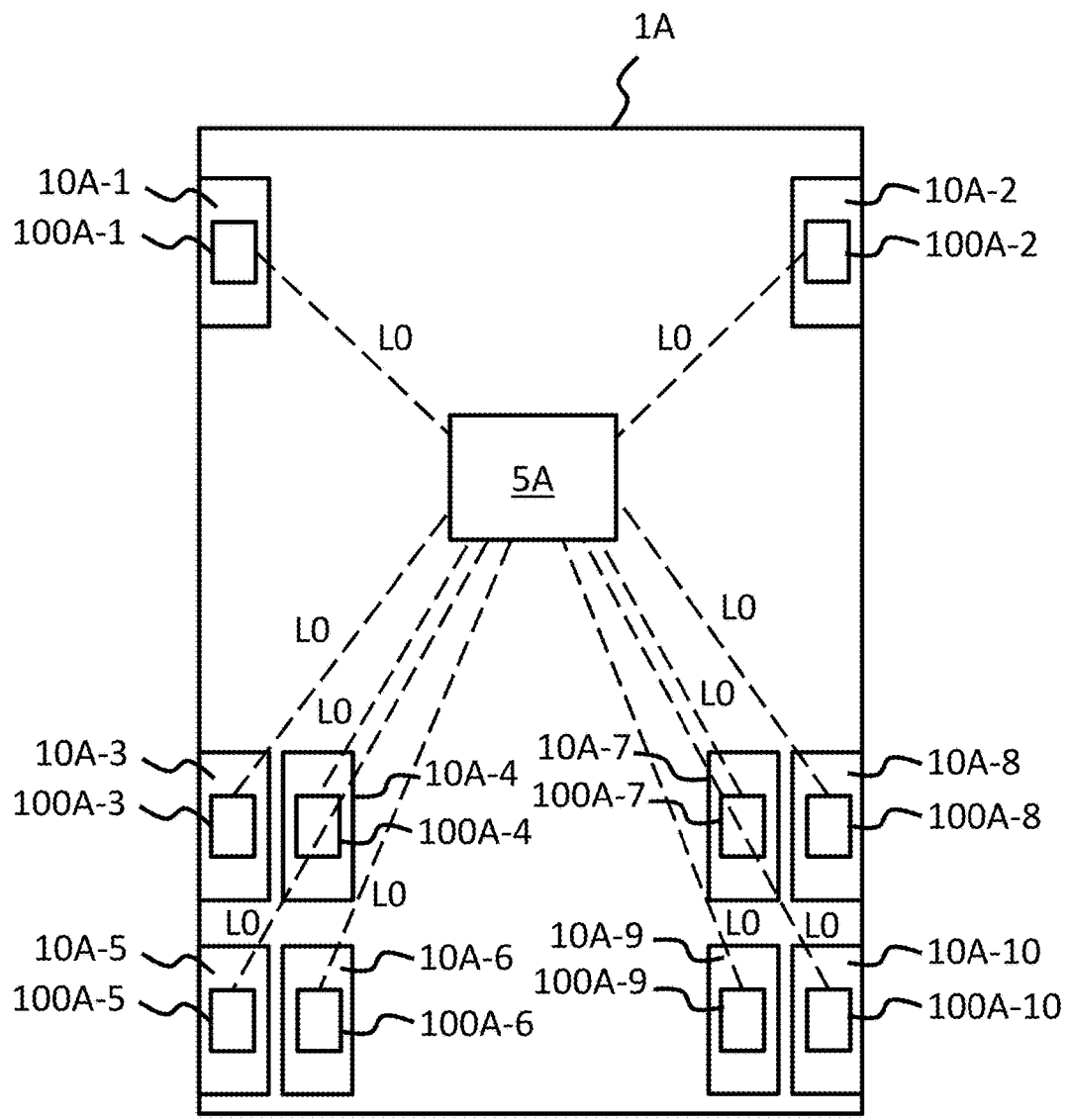
FIG. 1 (already mentioned) schematically illustrates a prior art vehicle in which each electronic measurement module communicates directly with the electronic control unit.
Figure 2:
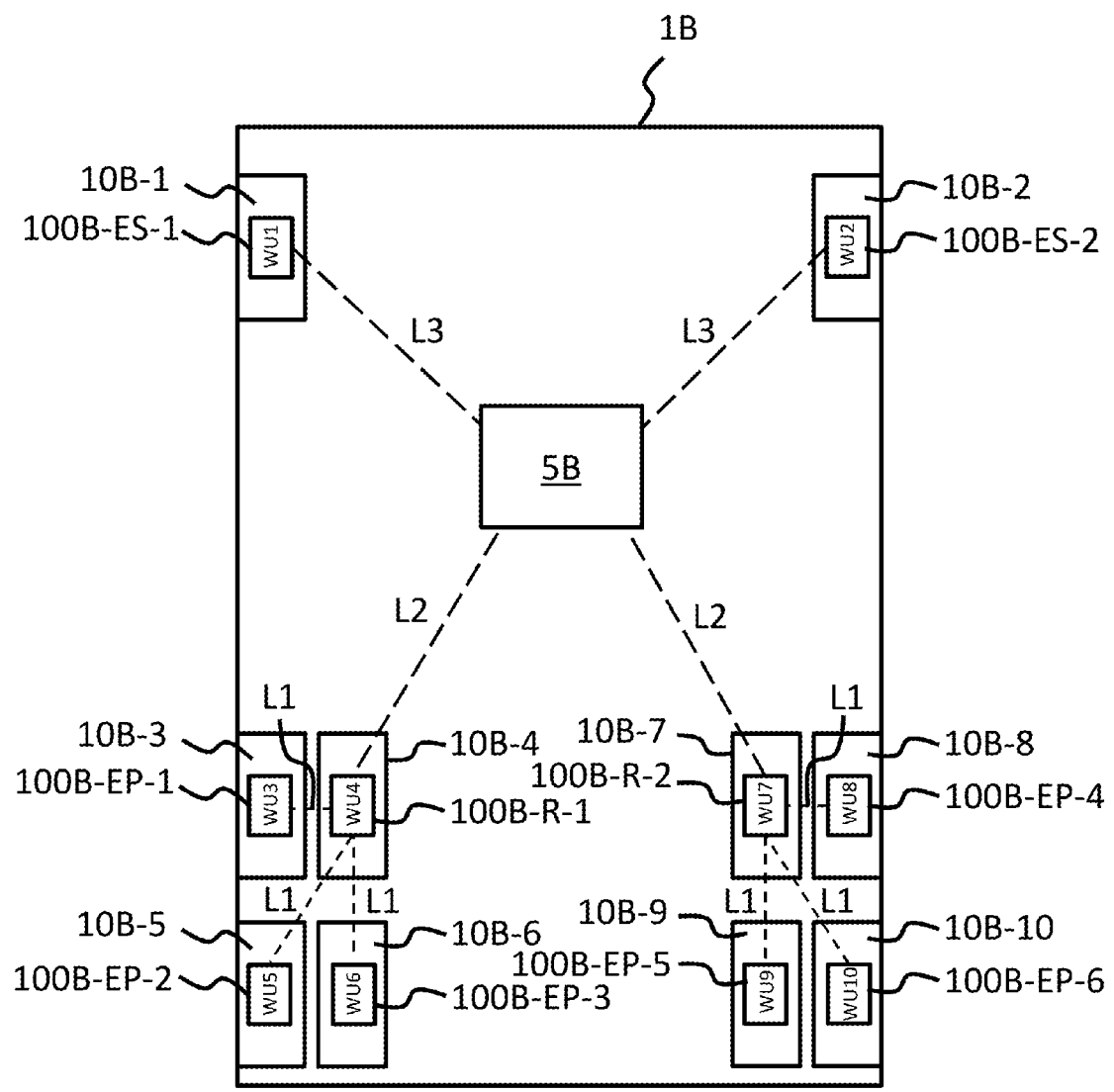
FIG. 2 schematically illustrates an embodiment of the vehicle according to the invention in a first communication configuration.

FIG. 2 schematically represents a motor vehicle 1B in order to illustrate the invention. The term "motor vehicle" should be understood to mean a road vehicle driven by an explosion engine, internal combustion engine, electric motor or gas turbine or a hybrid engine such as, for example, a car, a small truck, a truck, a two- or three-wheel motorcycle, etc.

This vehicle 1B comprises an electronic control unit 5B and a plurality of wheels 10B. In this nonlimiting example, the vehicle 1B comprises ten wheels 10B (numbered from 10B-1 to 10B-10) but it goes without saying that the vehicle 1B could comprise more or less than ten wheels 10B.

Each wheel 10B, as is known, comprises a rim (not represented) on which is mounted a tire (not represented) delimiting an internal inflation space between said rim and said tire and in which an electronic measurement module 100B is mounted. Such a module can for example be glued onto the internal face of the tire or fixed to the inflation valve of the wheel.

The electronic measurement modules 100B and the electronic control unit 5B constitute the nodes of a radio communication system.

Each electronic measurement module 100B is associated with a unique identifier in the system and comprises one or more sensors (not represented) capable of measuring parameters of the wheel and a battery (not represented) supplying these sensors with energy. As an example, these sensors can make it possible to measure the pressure or the temperature prevailing in the internal inflation space or else the acceleration of the module 100B.

The electronic measurement module 100B is configured to send, over a radio communication link L1, L2, L3, the measurements performed by the sensor(s) in so-called "measurement" messages coded in a radio signal. The expression "send measurement messages" should be understood to mean that an electronic measurement module 100B emits signals comprising messages in which are inserted measurements performed by one or more sensors of a module 100B. However, in order to be identified by the electronic control unit 5B, these messages also comprise other information such as the identifier of the electronic measurement modules 100B. The emission of radio signals comprising messages is known per se, so it will not be detailed more here.

According to the invention, the vehicle 1B comprises two functional types of electronic measurement modules: emitter modules 100B-E and the relay modules 100B-R (numbered from 100B-R-1 to 100B-R-2 in this example).

Among the emitter modules 100B-E, a distinction is made between the primary emitter modules 100B-EP (numbered from 100B-EP-1 to 100B-EP-6 in this example) and the secondary emitter modules 100B-ES (numbered from 100B-ES-1 to 100B-ES-2 in this example).

The primary emitter modules 100B-EP are configured to emit signals comprising measurement messages to a given relay module 100B-R on a first communication link L1, preferably at low power, that is to say at an emission power below a first threshold, for example 4 µW for an emission frequency of 433 MHz (i.e. approximately −24 dBm), in order to consume little energy. In this example, the primary emitter modules 100B-EP-1, 100B-EP-2 and 100B-EP-3 are thus configured to send messages to the relay module 100B-R-1 and the primary emitter modules 100B-EP-4, 100B-EP-5 and 100B-EP-6 are thus configured to send messages to the relay module 100B-R-2.

According to the invention, at least one of the electronic measurement modules 100B is a relay module 100B-R which will act as a relay between one or more primary emitter modules 100B-EP (its predecessors) and the electronic control unit 5B while performing its own measurements that it also sends to the electronic control unit 5B with the measurement messages received from its predecessors.

The relay modules 100B-R are configured to receive the signals comprising the measurement messages emitted by the primary emitter modules 100B-EP and to emit signals comprising the measurement messages received and their own measurements to the electronic control unit 5B over a second communication link L2, for example at high power, that is to say at an emission power above a second threshold (higher or equal to the first threshold), for example 14 µW for an emission frequency of 433 MHz (i.e. approximately −18.5 dBm), in order to ensure that the electronic control unit 5B receives the transferred messages. It will be noted that the first threshold and the second threshold could be equal. In this example, the relay module 100B-R-1 stores a list of predecessors (sent by the electronic control unit 5B) comprising the identifiers of the primary emitter modules 100B-EP-1, 100B-EP-2 and 100B-EP-3 in order to transfer only the messages that it receives from these three primary emitter modules 100B-EP-1, 100B-EP-2 and 100B-EP-3. Similarly, the relay module 100B-R-2 stores a list of predecessors (sent by the electronic control unit 5B) containing the identifiers of the primary emitter modules 100B-EP-4, 100B-EP-5 and 100B-EP-6 in order to transfer only the messages that it receives from these three primary emitter modules 100B-EP-4, 100B-EP-5 and 100B-EP-6.

The secondary emitter modules 100B-ES are configured to send measurement messages directly to the electronic control unit 5B over a communication link L3 at an emission power above a third threshold, for example at intermediate power between the first threshold and the third threshold (for example between 5 and 13 µW, i.e. between −23 and −18.5 dBm) or at high power (for example 14 µW for an emission frequency of 433 MHz, i.e. approximately −18.5 dBm). In this example, the secondary emitter modules 100B-ES-1 and 100B-ES-2 thus send their measurement messages directly to the electronic control unit 5B without passing through a relay module 100B-R or relaying measurement messages received from the primary emitter modules 100B-EP.

In order to allow a primary emitter module 100B-EP to send its messages to a given relay module 100B-R (recipient or successor), or allow a secondary emitter module 100B-ES to send its messages to the electronic control unit 5B, it is necessary for each primary emitter module 100B-EP and each secondary emitter module 100B-ES to know the power level with which it must emit a measurement message. Similarly, each relay module 100B-R must know the identifier of the primary emitter modules 100B-EP from which it must receive measurement messages (that is to say its predecessors), in order to transmit only these messages to the electronic control unit 5B and not other measurement messages received from other primary emitter modules 100B-EP or from the secondary emitter modules 100B-ES.

The determination of the predecessors and of the successors is performed by the electronic control unit 5B which communicates to each electronic measurement module 100B the identifier of its successor or successors and, if it is a relay module 100B-R, of its predecessors. As a variant or in addition, the electronic control unit 5B can also communicate to each electronic measurement module 100B the power level with which it must emit.

Each electronic measurement module 100B is therefore configured to receive from the electronic control unit 5B a configuration message comprising a list comprising at least one identifier of a successor, or even a list of at least one predecessor (in the case of a relay module 100B-R) and/or at least a level of emission power to at least one successor.

For this, in this initialization phase each electronic measurement module 100B is configured to emit, in succession at different powers, an initialization message to the other modules 100B (and the electronic control unit 5B) which then each evaluate the distance, in terms of power, separating it from said emitter electronic measurement module 100B.

In other words, in the initialization phase, each electronic measurement module 100B determines the minimum emission power that it must use to communicate with each of the other electronic measurement modules 100B.

Each electronic measurement module 100B sends, for example in the form of a list, this information on distance, in terms of power, with the other modules to the electronic control unit 5B which then compiles a routing table for the messages between the modules 100B and the electronic control unit 5B.

More particularly, the electronic control unit 5B classifies all the electronic measurement modules 100B as a function of this distance, in terms of power, and then determines the role of each module 100B (primary emitter module 100B-EP, secondary emitter module 100B-ES or relay module 100B-R).

The electronic control unit 5B then informs the duly determined primary emitter modules 100B-EP of the list of the relay module or modules 100B-R to which they must emit their measurement messages (at a power below the first threshold), the relay modules 100B-R of the primary emitter modules from which they must receive measurement messages (predecessors) to transfer them to the electronic control unit 5B with their own measurements and the secondary emitter modules 100B-ES that they must not transfer messages received but send their measurements directly to the electronic control unit 5B. It will be noted that, in another embodiment, a plurality of relay modules 100B-R could be used in succession to transfer measurement messages (and their own measurements).

The invention will now be described in its implementation with reference to FIGS. 2 to 4.

Figure 3:
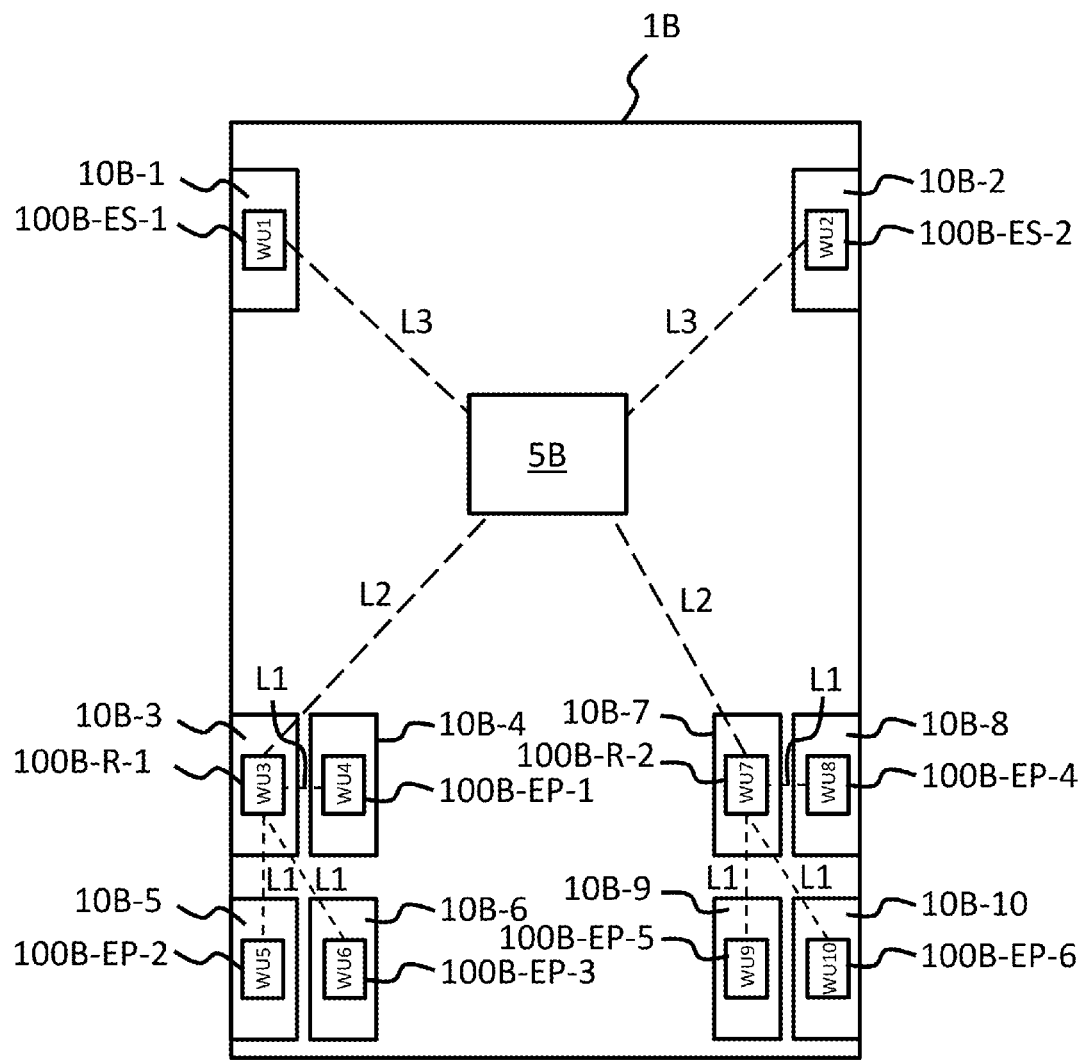
FIG. 3 schematically illustrates an embodiment of the vehicle according to the invention in a second communication configuration.
Figure 4:
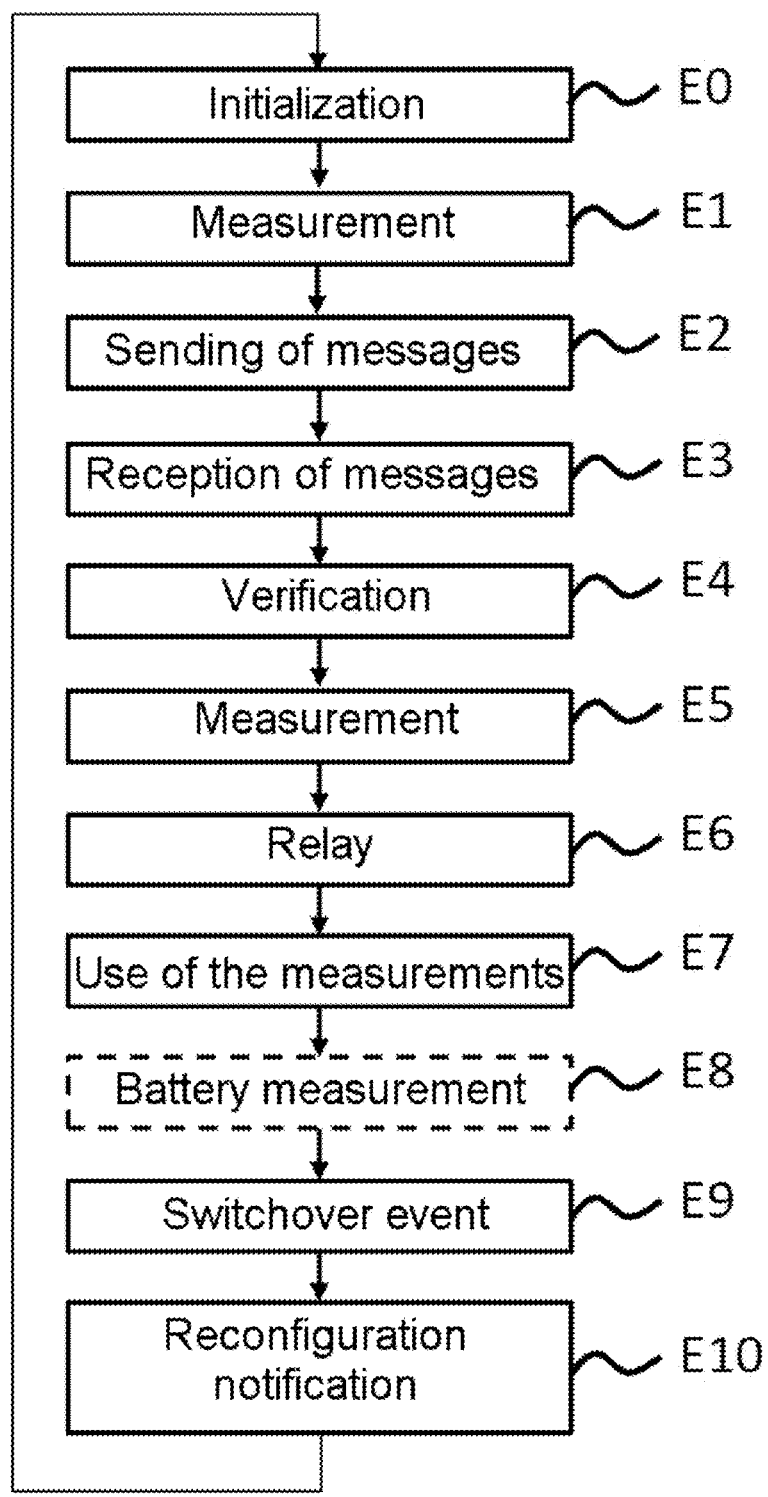
FIG. 4 schematically illustrates an embodiment of the method according to the invention.

In the nonlimiting example of FIGS. 2 and 3, the vehicle 1B comprises ten wheels 10B: a left front wheel 10B-1, a right front wheel 10B-2, two pairs of left rear wheels (10B-3 (left rear front left)/10B-4 (left rear front right) and 10B-5 (left rear rear left)/10B-6 (left rear rear right)) and two pairs of right rear wheels (10B-7 (right rear front left)/10B-8 (right rear front right) and 10B-9 (right rear rear left)/10B-10 (right rear rear right)).

The measurement modules 100B are each identified by an identifier according to the following configuration:

WU1 is the identifier of the electronic measurement module 100B of the left front wheel 10B-1, WU2 is the identifier of the electronic measurement module 100B of the right front wheel 10B-2, WU3 is the identifier of the electronic measurement module 100B of the left rear front left wheel 10B-3, WU4 is the identifier of the electronic measurement module 100B of the left rear front right wheel 10B-4, WU5 is the identifier of the electronic measurement module 100B of the left rear rear left wheel 10B-5, WU6 is the identifier of the electronic measurement module 100B of the left rear rear right wheel 10B-6, WU7 is the identifier of the electronic measurement module 100B of the right rear front left wheel 10B-7, WU8 is the identifier of the electronic measurement module 100B of the right rear front right wheel 10B-8, WU9 is the identifier of the electronic measurement module 100B of the right rear rear left wheel 10B-9, and WU10 is the identifier of the electronic measurement module 100B of the right rear rear right wheel 10B-10.

In a step E0 (called initialization step), it is necessary to initialize the system by evaluating the radio quality of the communication links between the electronic measurement modules 100B and also the electronic control unit 5B.

To this end, each electronic measurement module 100B implements, in turn, for example on request from the electronic control unit 5B, the following sequence. First of all, the electronic measurement module 100B emits a detection signal at a first test power. The electronic measurement modules 100 and/or the electronic control unit 5B receiving this detection signal then respond to the module having emitted the signal with their respective identifier. Then, the electronic measurement module 100B emits the detection signal at a second test power, higher than the first test power (for example by 0.5 dBm). The electronic measurement modules 100B and/or the electronic control unit 5B receiving this detection signal then respond to the module having emitted the signal with their respective identifier. The electronic measurement module 100B continues to emit the detection signal at higher powers increased by steps until all the other electronic measurement modules 100B and the electronic control unit 5B have responded to the module having emitted the signal at the different powers or else up to the maximum power limit of the emitting electronic measurement module 100B. The electronic measurement module 100B then sends to the electronic control unit 5B the list of the distances (or emission powers) separating it from the other electronic measurement modules 100B and from the electronic control unit 5B. To avoid interferences, each electronic measurement module 5B produces this list of distances in turn (that is to say by being the only one to emit during the sequence) then sends it also to the electronic control unit 5B.

Once the electronic control unit 5B has received the lists from each of the electronic measurement modules 100B of the system, the electronic control unit 5B then compiles a routing table for the measurement messages between the electronic measurement modules 100B themselves on the one hand and with the electronic control unit 5B on the other.

Figures 5, 6:
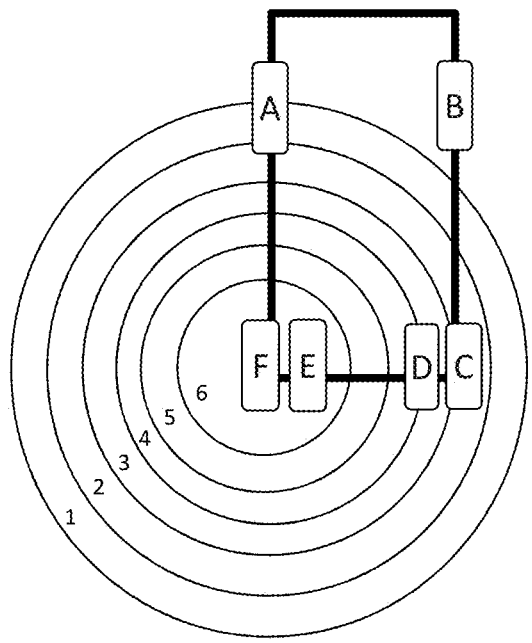
FIG. 5 schematically illustrates an example of routing table.
FIG. 6 schematically illustrates an example of distance, in terms of power, separating an electronic measurement module from the others.

FIG. 5 schematically illustrates a routing table example. In this example, the vehicle has six wheels A, B, C, D, E, F and the distances in terms of power are embodied by a so-called "proximity" score S that is a function of the emission power and that can vary from 6 (close) to 1 (distant). Referring to FIG. 6, the initialization performed by the wheel F gives, for example, a score of 6 for the wheel E (the closest to the wheel F), a score of 3 for the wheel D, a score of 2 for the wheel C and a score of 1 for the wheel A (the wheel B not being referenced because it is too far away). As a nonlimiting example, these distances in terms of power are measured as RSSI "Received Signal Strength Indication" values.

Such a routing table can, for example and advantageously, be produced by the electronic control unit 5B by applying the so-called "graph" theory, a theory that is known per se, that is to say by linear optimization of NP-complete problems.

FIG. 2 illustrates a first example of configuration of the system in which the electronic control unit 5B has indicated

- to the electronic measurement modules 100B-EP-1, 100B-EP-2, 100B-EP-3 respectively identified WU3, WU5 and WU6 to send their measurement messages to the electronic measurement module 100B-R-1 identified WU4 (relay module), at a predetermined so-called "low" power, that is to say below a first predetermined power threshold, for example of 4 µW for an emission frequency of 433 MHz (i.e. approximately −24 dBm),
- to the electronic measurement module 100B-R-1 identified WU4 to send its measurements and the measurement messages that it has received from the electronic measurement modules 100B-EP-1, 100B-EP-2, 100B-EP-3 respectively identified WU3, WU5 and WU6 to the electronic control unit 5B, at a predetermined so-called "high" power, that is to say above a second predetermined power threshold, for example of 14 µW for an emission frequency of 433 MHz (i.e. approximately −18.5 dBm),
- to the electronic measurement modules 100B-EP-4, 100B-EP-5, 100B-EP-6 respectively identified WU8, WU9 and WU10 to send their measurement messages to the electronic measurement module 100B-R-2 identified WU7 (relay module), at a predetermined so-called "low" power, that is to say below the first predetermined power threshold, and
- to the electronic measurement module 100B-R-2 identified WU7 to send its measurements and the measurement messages that it has received from the electronic measurement modules 100B-EP-4, 100B-EP-5, 100B-EP-6 respectively identified WU8, WU9 and WU10 to the electronic control unit 5B, at a predetermined so-called "high" power, that is to say above the second predetermined power threshold, for example of 14 µW for an emission frequency of 433 MHz (i.e. approximately −18.5 dBm),
- to the electronic measurement modules 100B-ES-1, 100B-ES-2 respectively identified WU1 and WU2 to send their measurement messages directly to the electronic control unit 5B at a power above a third predetermined power threshold, for example lying between −23 and −18.5 dBm.

Thus, the electronic measurement modules 100B-EP-1, 100B-EP-2, 100B-EP-3, 100B-EP-4, 100B-EP-5, 100B-EP-6 respectively identified WU3, WU5, WU6, WU8, WU9 and WU10 are primary emitter modules 100B-EP. The electronic measurement modules 100B-ES-1 and 100B-ES-2 respectively identified WU1 and WU2 are secondary emitter modules 100B-ES. The electronic measurement modules 100B-R-1 and 100B-R-2 respectively identified WU4 and WU7 are relay modules 100B-R.

Such a configuration of the system makes it possible to evaluate the distances, in terms of emission power, separating the electronic measurement modules 100B of the communication system in order for each module 100B to be able to emit with a power matched to its role as a function of its distance (in terms of power) separating it from the electronic control unit 5.

Once the system is initialized, the electronic measurement modules 100B (nodes) of the system will be able to exchange measurement messages ultimately intended for the electronic control unit 5.

In system operation, the primary emitter modules 100B-EP-1, 100B-EP-2, 100B-EP-3, 100B-EP-4, 100B-EP-5, 100B-EP-6 measure, in a step E1, (called measurement step) parameter values of the associated wheel 10B-1, 10B-2, 10B-3, 10B-4, 10B-5, 10B-6 and send, in a step E2 (called measurement message sending step), for example periodically, these measurements in measurement messages which are received directly by the relay modules 100B-R WU4 and WU7 in a step E3 (called reception step).

Similarly, the secondary emitter modules 100B-ES (WU1 and WU2) send, for example periodically, their measurement messages which are received directly by the electronic control unit 5B. When it receives a measurement message from an emitter module 100B-E, each relay module 100B-R checks the identifier included in the message and determines whether said emitter module 100B-E is in its list of predecessors in a step E4 (called verification step). In parallel, the relay module 100B-R performs its own measurements in a step E5 (called measurement step). When the relay module 100B-R has received at least one measurement message from each of the primary emitter modules 100B-EP in its list of predecessors, it emits, in a step E6 (called relay step), to the electronic control unit 5B, a signal comprising all the measurement messages received from the primary emitter modules 100B-EP from its list of predecessors and the measurements performed in the step E5.

When it receives measurement messages associated with modules 100B of the system, the electronic control unit 5B analyzes them and uses the measurements in a step E7 (called measurement use step), for example, to manage operating parameters of the vehicle or else display these measurements for the attention of the driver, notably to signal to him or her an anomaly on one of the wheels.

With each measurement message emission consuming energy, each relay module 100B-R can evaluate, in a step E8 (called battery measurement step), for example periodically, the energy level of its power supply battery.

When a specific so-called "switchover" event occurs, in a step E9 (called switchover event step), for a given module 100B (in this example the relay module 100B-R-1 identified WU4), the latter sends a switchover request to the electronic control unit 5B to indicate to it that it is necessary for the relay module 100B-R-1 to become an emitter module 100B-E (primary 100B-EP or secondary 100B-ES).

Such an event can be an energy level below a predetermined energy threshold. As a variant or in addition, the information on the battery level can be transmitted periodically to the electronic control unit 5B such that the electronic control unit 5B directly decides on the switchover. It will be noted that the event can be predetermined: for example a rotation can be organized, for example at a predetermined frequency, between the modules 100B in order for each in turn to become a relay module 100B-R for a fixed period.

The sending of a switchover request can moreover be performed by any electronic measurement module 100B whether it is a relay module 100B-R or an emitter module 100B-E. In this case, it can relate to any relevant specific type of event such as, for example, the detection of one or more new electronic measurement modules 100B on the vehicle 1B (for example replacing previous ones), the detection of one or more changes of positions or of location of the electronic measurement modules 100B of the vehicle 1B, the detection of a change of a measurement datum (for example the temperature in the tire or the load applied to the wheel), or even periodically (for example at the start of each running cycle, or every 24 hours, etc.).

Once the switchover request is received by the electronic control unit 5B, the electronic control unit 5B sends, in a step E10 (called reconfiguration notification step), a notification to all the electronic measurement modules 5B of the system (that is to say all the other nodes of the system) in order for them to proceed with a reconfiguration (or reinitialization) of the system (step E0).

In the example illustrated in FIG. 3, following this reinitialization, the module 100B identified WU4 which had sent the switchover request is transformed into a primary emitter module 100B-EP-1 in order to preserve its battery.

It will be noted that, in a new configuration, one or more other modules, previously emitters 100B-E, can become relay modules 100B-R and vice-versa. In the example of FIG. 3, the electronic measurement module of the wheel 10B-3 (identified WU3) becomes relay module 100B-R-1 in place of the electronic measurement module of the wheel 10B-4.

It will also be noted that, in another configuration, a single electronic measurement module 100B could be a relay module 100B-R.

Furthermore, as a variant, rather than recommencing an entire reconfiguration phase (E0) of the system, the topology already being established, the electronic control unit 5B can directly send "update" notifications only to the modules 100B concerned. In the example illustrated in FIG. 3, the electronic control unit 5B can send a reconfiguration notification to just the modules 100B concerned (identified WU3 and WU4) without so informing the other modules 100B (WU1, WU2, WU5, WU6, WU7, WU8, W9 and W10) which keep the same role in the system.

It goes without saying that the order of the steps E1 to E7 is not linked to the order of the steps E8 to E10 and that these two groups of steps can be performed in parallel.

The system according to the invention therefore advantageously makes it possible to communicate measurement messages to the electronic control unit 5B by using some of the modules 100B as relays in order to optimize the management of the energy of the modules.

It is also specified that the present invention is not limited to the examples described above and is open to numerous variations accessible to those skilled in the art.

The invention claimed is:

1. A method for communicating measurement messages between a plurality of electronic measurement systems and an electronic controller of a motor vehicle, each of the electronic measurement systems being mounted in a wheel of said vehicle, said method comprising:
    measuring, by at least one first electronic measurement system of the electronic measurement systems that is a primary emitter system, parameter values associated with the wheel in which said primary emitter system is mounted;
    sending, by said primary emitter system, over a first radio communication link at a power below a first threshold, measurement messages to at least one second electronic measurement system, of the electronic measurement systems, that is mounted in the wheel of the vehicle, the second electronic measurement system being a relay system;
    receiving, by said relay system the measurement messages sent over the first radio communication link;
    measuring, by the relay system, parameter values associated with the wheel in which said relay system is mounted to obtain its own measurements; and
    sending, by the relay system, the measurement messages received and the measurements obtained by the relay system to the electronic controller over a second radio communication link at a power above a second threshold, higher than or equal to the first threshold.

2. The method according to claim 1, further comprising initializing, in a preliminary initialization step performed by the electronic controller, each electronic measurement system of the vehicle in order to define the role of each electronic measurement system.

3. The method according to claim 2, wherein, in the preliminary initialization step, each electronic measurement system emits, at different powers, an initialization message to the other electronic measurement systems and the electronic controller in order to determine the distance, in terms of power, separating the respective electronic measurement system from the other electronic measurement systems and from the electronic controller.

4. The method according to claim 3, wherein the electronic controller receives, from each electronic measurement system, a list of the determined distances separating said respective electronic measurement system from the other electronic measurement systems, classifies all the electronic measurement systems as a function of the determined distances between the electronic measurement systems, determines the role of each electronic measurement system and informs the primary emitter systems that the primary emitter systems must emit at a power below the first threshold and informs the relay systems of the list of the identified primary emitter systems for which the relay systems must transfer the messages received, with measurements of the relay systems, to the electronic controller, in signals emitted at a power above the second threshold.

5. The method according to claim 4, wherein the relay system concentrates the measurement messages received from a plurality of identified primary emitter systems from which the relay system must receive messages before sending the the messages grouped together with the measurements of the relay system to the electronic controller.

6. The method according to claim 4, further comprising sending a switchover request to the electronic controller following a switchover event to indicate to the electronic controller that it is necessary to redefine all or some of the roles of the electronic measurement systems.

7. The method according to claim 3, wherein the relay system concentrates the measurement messages received from a plurality of identified primary emitter systems from which the relay system must receive messages before sending the the messages grouped together with the measurements of the relay system to the electronic controller.

8. The method according to claim 3, further comprising sending a switchover request to the electronic controller following a switchover event to indicate to the electronic controller that it is necessary to redefine all or some of the roles of the electronic measurement systems.

9. The method according to claim 2, wherein the relay system concentrates the measurement messages received from a plurality of identified primary emitter systems from which the relay system must receive messages before sending the the messages grouped together with its the measurements of the relay system to the electronic controller.

10. The method according to claim 2, further comprising sending a switchover request to the electronic controller following a switchover event to indicate to the electronic controller that it is necessary to redefine all or some of the roles of the electronic measurement systems.

11. The method according to claim 1, wherein the relay system concentrates the measurement messages received from a plurality of identified primary emitter systems from which the relay system must receive messages before sending the the messages grouped together with the measurements of the relay system to the electronic controller.

12. The method according to claim 11, further comprising sending a switchover request to the electronic controller following a switchover event to indicate to the electronic controller that it is necessary to redefine all or some of the roles of the electronic measurement systems.

13. The method according to claim 1, further comprising sending a switchover request to the electronic controller following a switchover event to indicate to the electronic controller that it is necessary to redefine all or some of the roles of the electronic measurement systems.

14. The method according to claim 1, wherein the second electronic measurement system that is the relay system is closer to the electronic controller in terms of radio power than the first electronic measurement system that is the primary emitter system.

15. A communication system for a motor vehicle comprising:
an electronic controller; and
a plurality of electronic measurement systems each mounted in a wheel of said vehicle, said plurality of electronic measurement systems comprising at least one first electronic measurement system that is a primary emitter system and at least one second electronic measurement system that is a relay system, said primary emitter system being configured to measure parameter values associated with the wheel in which said primary emitter system is mounted and to emit, to said relay system, over a first radio communication link at a power below a first threshold, signals comprising measurement messages, the relay system being configured to receive signals emitted by the primary emitter system, to measure parameter values associated with the wheel in which said relay system is mounted to obtain its own measurements, and to emit signals comprising the measurement messages received and the measurements obtained by the relay system to the electronic controller over a second radio communication link at a power above a second threshold, higher than or equal to the first threshold.

16. The communication system according to claim 15, wherein the electronic controller is configured to initialize the communication system by defining the role of each electronic measurement system of the vehicle.

17. The communication system according to claim 16, wherein each electronic measurement system is configured to send a switchover request to the electronic controller following a switchover event to indicate to the electronic controller that it is necessary to redefine all or some of the roles of the electronic measurement systems.

18. A motor vehicle comprising:
the communication system according to claim 16.

19. The communication system according to claim 15, wherein each electronic measurement system is configured to send a switchover request to the electronic controller following a switchover event to indicate to the electronic controller that it is necessary to redefine all or some of the roles of the electronic measurement systems.

20. A motor vehicle comprising:
the communication system according to claim 15.

* * * * *